United States Patent [19]

McFadden

[11] Patent Number: 5,373,704
[45] Date of Patent: Dec. 20, 1994

[54] DESICCANT DEHUMIDIFIER

[75] Inventor: David H. McFadden, Lexington, Mass.

[73] Assignee: Arthur D. Little, Inc., Cambridge, Mass.

[21] Appl. No.: 782,906

[22] Filed: Oct. 24, 1991

Related U.S. Application Data

[63] Continuation of Ser. No. 510,278, Apr. 17, 1990, abandoned.

[51] Int. Cl.⁵ .............................................. F25D 17/06
[52] U.S. Cl. .......................................... 62/94; 62/271
[58] Field of Search ................ 62/271, 93, 94, 238.3; 165/16

[56] References Cited

U.S. PATENT DOCUMENTS

| | | |
|---|---|---|
| 1,819,643 | 8/1931 | Fleisher .................................... 62/94 |
| 2,723,837 | 11/1955 | Pennington . |
| 2,926,502 | 3/1960 | Munters et al. . |
| 3,009,684 | 11/1961 | Munters . |
| 3,144,901 | 8/1964 | Meek . |
| 3,470,708 | 10/1969 | Weil et al. . |
| 3,965,695 | 6/1976 | Rush et al. . |
| 4,060,913 | 12/1977 | Yoshida et al. . |
| 4,062,129 | 12/1977 | Yoshida et al. . |
| 4,113,004 | 9/1978 | Rush et al. ............................ 62/271 |
| 4,180,126 | 12/1979 | Rush et al. . |
| 4,719,761 | 1/1988 | Cromer . |
| 4,887,438 | 12/1989 | Meckler ................................ 62/271 |

Primary Examiner—John M. Sollecito
Attorney, Agent, or Firm—Lappin & Kusmer

[57] ABSTRACT

An improved air recirculation and conditioning system for recirculating and dehumidifying air within a living space is disclosed. In accordance with one aspect of the present invention the system diverts a portion of the air recirculated through a return and removes moisture from that portion of the air before mixing the drier air with the air in the return. In accordance with another aspect of the invention the system makes use of a standard water heater as a source of heat to heat a regenerative air stream to regenerate a desiccant wheel of the system. Finally, in accordance with another aspect of the present invention, the system externally draws all of the air for the regenerative air stream and exhausts the regenerative air stream to an air space external of the living space within which the air is being treated.

18 Claims, 3 Drawing Sheets

DESICCANT DEHUMIDIFIER

This is a continuation of copending application Ser. No. 07/510,278 filed on Apr. 17, 1990 now abandoned.

The present invention relates generally to air recirculating and conditioning systems, and more particularly to an improved, economically designed and efficient dehumidifying system for use with conventional central air conditioning (A/C) systems.

With much of the country, particularly in the Southeastern portion of the United States experiencing hot summers, more and more homes and commercial buildings are being provided with central air conditioning systems. Unfortunately, on extremely humid days, as is often the case in the Southeast, and areas along the Gulf coast, these central air conditioning systems, while cooling the air provided to the living space, are inadequate with respect to the removal of moisture, i.e., latent heat, since the cooled air provided is at or near 100% relative humidity. Such systems control only temperature with humidity control reduction as a by-product of a cold evaporator coil. A typical air conditioning system alone cannot dehumidify more than allowed by its coil design ratio. Thus, in order to remove more moisture with a conventional air conditioning system one must use a larger capacity system and operate the thermostat of the system at a lower setting so as to lower the dew point in order to provide greater moisture condensation. However, this results in excessive cooling, is counter productive to any passive cooling techniques that may be employed, and may result in uncomfortable, cold-clammy environments and cause excessive energy use. For example, A/C energy typically increases as much as 15% as the thermostat is reduces by 1° F.

One suggestion of reducing the relative humidity of air delivered to a living space is to first cool the air to a dew point below the desired temperature as described and then reheat the air to the desired temperature with a heater, such as the condenser heat from a condenser coil of the air conditioning unit. While this approach is workable, it does not increase the efficiency of the system because the air must be cooled below the desired temperature. In some systems, such as spot dehumidifiers, the air is reheated with electrically driven resistance coils further increasing the costs. This latter approach is obviously energy inefficient.

Further, spot dehumidifiers provide heat into the room. The typical electric spot dehumidifier, for example, adds roughly 2400 BTU of heat to the home for every pound of water that it condenses out of the air. Such spot dehumidifiers also require a sump or bucket for draining the water removed from the air, which is inconvenient for the user, as well as potentially messy if the water is not timely or inadequately drained.

It is also known to use heat exchangers in ventilating and air conditioning systems for transferring heat from the incoming outside air to the exhausted inside air, thus reducing the heat load of the fresh air. This process, however, can bring moisture from the outside air into the living space.

Various suggestions have been made to dehumidify or condition air. See, for example, U.S. Pat. Nos. 2,723,837; 2,926,502; 3,009,684; 3,144,901; 3,470,708; 3,965,695; 4,060,913; 4,062,129; 4,180,126; and 4,719,761.

Systems for conditioning and dehumidifying air which operate as the open-cycle type are described in U.S. Pat. Nos. 2,723,837; 2,926,502; 3,144,901; 3,470,703 and 4,180,126. Generally, in such systems an air stream to be conditioned passes through an air permeable drying wheel of a hygroscopic or desiccant material which absorbs moisture from the air substantially adiabatically. The dried air will therefore be at a higher temperature. The dried warmer air then flows through a rotating heat exchange mass so as to cool the air by removing sensible heat. The dried and cooled air then can be further cooled to the desired temperature and reconstituted to a desired humidity by evaporating water therein. The hygroscopic or desiccant material of the drying wheel is cyclically regenerated by a regenerative air stream. During regeneration, the regenerative air stream first can be cooled by evaporative cooling and then passed through the heat exchange mass thereby cooling the latter. Thereafter, the regenerative air stream is heated by means of an external heat source to a temperature sufficiently high to regenerate the hygroscopic material of the drying wheel, passed in thermal exchange relation to the hygroscopic material, and then discharged into the atmosphere (see U.S. Pat. No. 3,144,901). The usual external heat source for providing an external heat input for the regeneration step is an especially provided, open flame, natural gas burner (see, for example, U.S. Pat. No. 3,470,708). One suggestion is to use solar-derived energy to provide the necessary heat (see U.S. Pat. No. 4,180,126) although this is not always practical since not all building structures provided with central air conditioning can accommodate solar collectors and solar heat storage devices. Further, such additional structures, while providing some savings with respect to energy use, add substantial additional costs to the system.

U.S. Pat. No. 4,719,761 (Cromer) describes a recirculating air cooling system provided with a desiccant material used to contact and evaporate moisture into dry feed air prior to passing the feed air over the cooling coils of the air conditioner so as to increase the dew point (moisture content) of the feed air. This increases the amount of moisture removed by the cooling system. The desiccant material is used to absorb moisture from the moisture saturated air leaving the cooling coil and deliver the moisture to the feed air. The patentee believes the system will remove more moisture from the recirculated air at a higher average temperature of the evaporator coil, while providing the same enthalpy exchange as a conventional air conditioner. To the extent that the system removes moisture before exhausting the air back to the living space makes it similar to other dehumidification systems requiring drainage of excess moisture.

It is an object of the present to substantially reduce or overcome the above-identified problems of the prior art.

Another object of the present invention is to provide an improved air recirculating and conditioning system for reducing the humidity of air within an enclosed living space.

And another object of the present invention is to provide an improved air dehumidification system which is energy efficient.

And another object of the present invention is to provide an improved air dehumidification system which is capable of use with standard central air conditioning systems.

Yet another object of the present invention is to provide an improved air dehumidification system of the open-cycle type.

Still another object of the present invention is to provide an improved air dehumidification system of the open cycle type which can easily be installed for most enclosed living spaces without substantial construction and associated costs.

And yet another object of the present invention is to provide an improved air dehumidification system of the open cycle type which utilizes a standard hot water heater as a heat source for the regenerative air stream.

And still another object of the present invention is to provide an improved air dehumidification system of the open cycle type for use with an enclosed living space which draws and exhausts the regenerative air stream externally from the living space so as to have little direct effect on the temperature and humidity within the living space.

These and other objects of the present invention are achieved by an improved air recirculation and conditioning system for recirculating and dehumidifying air within a living space. In accordance with one aspect of the present invention the system diverts a portion of the air recirculated through a return and removes moisture from that portion of the air before mixing the drier air with the air in the return. In accordance with another aspect of the invention the system makes use of a standard water heater as a source of heat to heat a regenerative air stream to regenerate a desiccant wheel of the system. Finally, in accordance with another aspect of the present invention, the system externally draws all of the air for the regenerative air stream and exhausts the regenerative air stream to an air space external of the living space within which the air is being treated.

Other objects of the present invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims.

For a fuller understanding of the nature and objects of the present invention, reference should be had to the following detailed description taken in connection with the accompanying drawings wherein.

In the drawings the same numerals are used to designate the same or similar parts.

Figure 1:
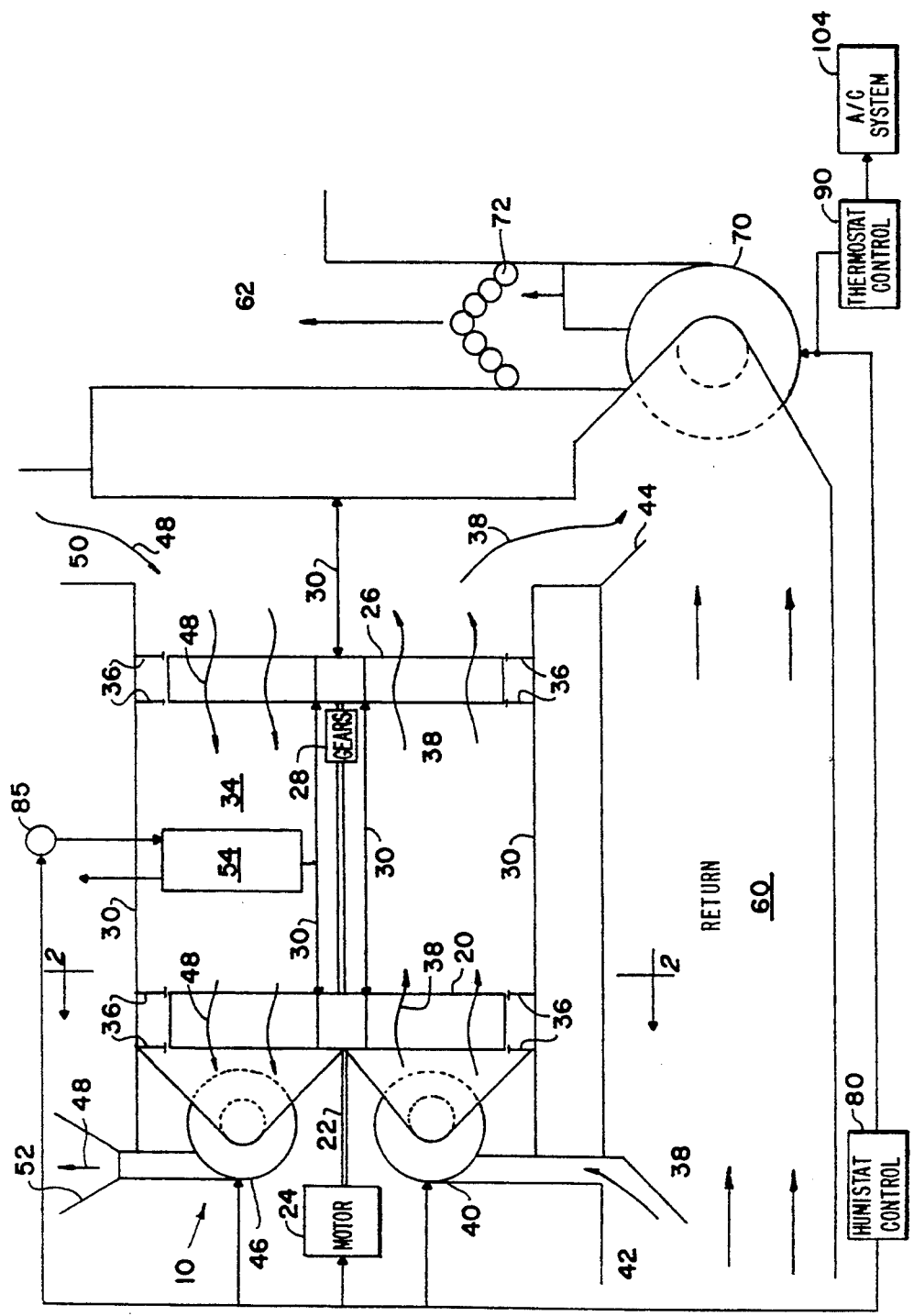
FIG. 1 is a schematic view of the air circulation and conditioning system of the present invention.
Figure 2:
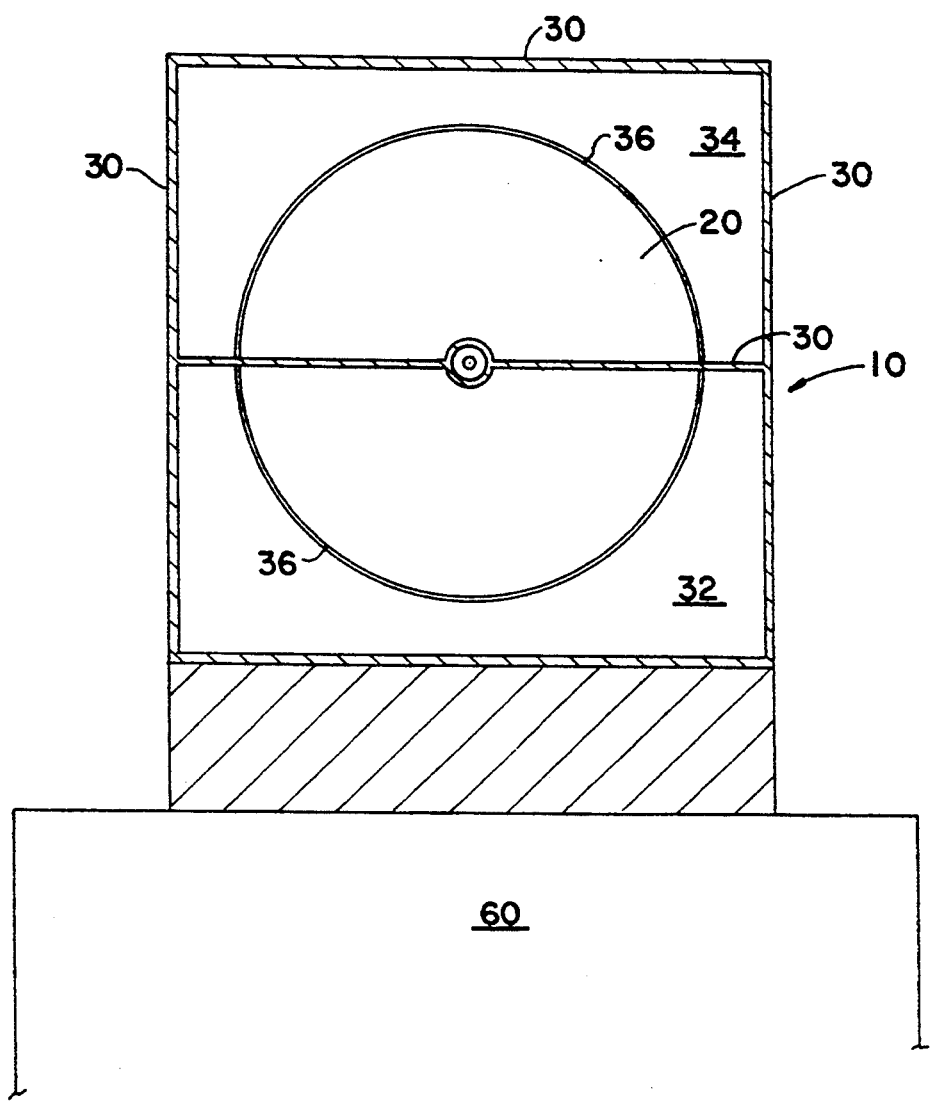
FIG. 2 is a cross-sectional view taken along line 2—2 in FIG. 1.

Referring to FIGS. 1 and 2, the system shown is intended for residential or light commercial installations, although the invention should not be construed to be limited to those applications. As shown the system 60 includes a dehumidifier of the open-cycle type specifically configured to operate with a standard return duct of an air recirculation system, which as shown is used with a central A/C system.

The system, shown at 10, generally includes desiccant means, in the form of a rotatable desiccant wheel 20, mounted on shaft 22 and driven at a constant speed by motor 24. The system also includes heat exchange means, in the form of a rotatable heat exchange wheel 26, also driven at a constant speed by motor 24 through shaft 22 and suitable gears 28. Desiccant wheel 20 can be of a commercial type, such as one manufactured by either Airxchange, Inc. of Rockland, Mass. or Seiby Giken Co. Ltd. of Japan, specifically designed for the present application. The heat exchange wheel 26 can also be of a commercial type, such as fin or honeycomb type. The wheels 20 and 26 are suitably enclosed by partitions 30. The latter are used to define a first air treatment passageway 32 and a second or regenerative air passageway 34, parallel with and separate from the first passageway, such that a portion of each wheel is disposed in each passageway at any one moment. Seals 36 are provided around the entire peripheral edges of the portions of the wheels disposed in the passageways in a suitable manner in order to insure that all of the air passing through each passageway passes through the portion of each wheel disposed in each passageway.

Means, in the form of a blower 40, is provided for creating an air treatment stream (designated by arrows 38) through the air treatment passageway 32 in the direction shown (left to right in FIG. 1) so that air flows from the air intake 42, through the portion of desiccant wheel 20 in passageway 32, through the portion of the heat exchange wheel 26 in passageway 32 and out the air output 44. Means, in the form of blower 46, is also provided for creating a regenerative air stream (designated by the arrows 48) through the regenerative air passageway 34 in the direction shown (opposite to the direction of air stream 38 and thus right to left in FIG. 1) so that air flows from the air intake 50, through the portion of the heat exchange wheel 26 in passageway 34, through the portion of the desiccant wheel 20 in passageway 34 and out the air output 52.

As described above, the regenerative air stream can be heated by heater means, such as an open flame, natural gas burner (see U.S. Pat. No. 3,470,708) or solar derived heat (see U.S. Pat. No. 4,180,126) prior to passing the air stream through the desiccant wheel 20 so that a greater amount of moisture absorbed by the portion of the desiccant wheel 20 while it was disposed in the air treatment passageway 32 will be absorbed by the regenerative air stream as that portion of the wheel passes through the regenerative air passageway 34.

To the extent described the system is known. However, in accordance with one aspect of the present invention the system 10 is coupled to a standard air recirculation system, i.e., the return conduit 60, so that the blower 40 draws a portion of the air drawn from the enclosed living space 62 and passing through the return into the air intake 42, and forces it through the air passageway 32 and out the air output 44 where it mixes with the air passing through the return conduit 60 before being forced back into the living space 62. In addition, for reasons which will be more apparent hereinafter the air intake 50 and air output 52 are connected so that the air for the regenerative air stream 48 is externally derived and is exhausted to a space external from the living space 62. Finally, as will be more evident hereinafter, because the air treatment stream 38 is derived from only a portion of the return air stream, the system can be compact and easily installed in a typical residence or small commercial establishment, and use a relatively small source of heat for the heater means, indicated at 54 in FIG. 1. In this latter regard, the heat source is preferably hot water tapped from a standard hot water heater described in FIG. 3.

Accordingly, means 54 is preferably a coil properly connected to a hot water heater so that hot water circulated though the coil will heat the stream 48 before the water is returned to the hot water heater. As shown in FIG. 1, the means for drawing air through the return conduit 60 can be a standard blower 70 for drawing air through the return conduit back into the living space 62. The mixed air provided by the blower can be passed through an evaporator coil 72 of a central A/C system to further reduce the temperature and humidity of the air returned to the living space 62.

In order to control the operation of the system a humidistat control 80, positioned in living space 62, can be suitably connected to simultaneously turn on motor 24, blowers 40 and 46, blower 70 and water circulation pump 85 (so that the latter allows water to circulate through the coil, designated at 54) when the relative humidity within the enclosed living space 62 exceeds the setting of the humidistat. Such a control can be independent of a thermostat control 90 used to control the central A/C system 104, which would necessarily include blower 70 and coil 72 and separately operate the blower 70 when the A/C system was on.

As an example of typical parameters of the system the desiccant wheel 20 is rotated at a much slower speed than the heat exchange wheel, with the former rotated at a rate of about 8 to 12 rph, while the latter is rotated at a rate of about 20 to 30 rpm. The blower 70 is sized to draw air through the return conduit 60 at a flow rate of about 1000 to 1200 scfm (Typical for a 36,000 btu/m A/C unit). The blowers 40 and 46 are preferably of equal capacity, with the air flow of the air treatment stream being about 10% to 20% of that of the return air stream in conduit 60. In the present example, an air flow of 150 scfm for each air stream 38 and 48 would be adequate. Therefore, if the incoming air through the return conduit is at a temperature of 78° F. at 50% relative humidity, i.e., a dew point of 57.9° F. (specific humidity=0.0102 lb/lb), the air forming the air treatment stream 38 will pass through the desiccant wheel 20 and exit the wheel at a higher temperature and lower dew point, e.g., 101° F. at 14% relative humidity, i.e., a dew point of 42° F. The air stream is then cooled by the heat exchange wheel 26 to a temperature of, for example, 91° F. at 20% relative humidity, i.e., at a dew point of 42° F. The air stream exiting the air output 44 of the passageway 32 is thus at a higher temperature than the temperature passing through the conduit 60, but at a lower humidity level. As a consequence when the two air streams are mixed the resulting mixed air will be at a slightly higher temperature, at approximately 79.5° F., than the original air entering the conduit 60, but at a lower humidity level, at approximately 44% relative humidity, i.e., at a dew point of 55.9° F. (Specific humidity=0.0095 lb/lb). However, the mixed air can be further cooled and have additional moisture removed by passing the mixed air over an evaporation coil 72 of a standard A/C system, typically provided, for example, in residential central A/C system.

In order to regenerate the desiccant wheel 20, air is drawn from a space which is external from the air space 62, and exhausted to a space also external from the living space 62 so that the moisture added to the regenerative air stream will have no affect on the humidity level of the air within the living space. The air intake 50, for example, can be attached so as to draw air from a crawl space, the basement or from the outdoors. Similarly, the air output 52 can be coupled to a crawl space, the basement or the outdoors so that the air is exhausted to a different area from the living space.

In addition, since only a portion of the air from the return conduit is drawn through the air treatment passageway, the requirements for heating the regenerative air stream 48 is lowered to the point where the heater means 54 can include a circulating coil attached to a standard water heater. The coil can be constructed to provide a flow of approximately 1 to 2 gallons per minute at a temperature of approximately 150° F. when the pump 85 is actuated. At this flow level, and at the levels described above, incoming air at a temperature of about 88° F. at 60% relative humidity, will be heated to about 98° F. after passing through the heat exchange wheel 26, and subsequently raised to about 140° F. after passing through the coil indicated at 54. The warm air is then passed through the portion of the desiccant wheel 20 disposed in the regenerative air passageway 34 where a substantial portion of the moisture previously absorbed by the desiccant material is reabsorbed by the air stream. This results in cooling the stream to a temperature of approximately 117° F. This warm, wet air exhausted through the output 52, does not directly affect the air within the enclosed living space 62 since the regenerative air stream is externally derived from the living space and similarly exhausted to an external space.

Figure 3:
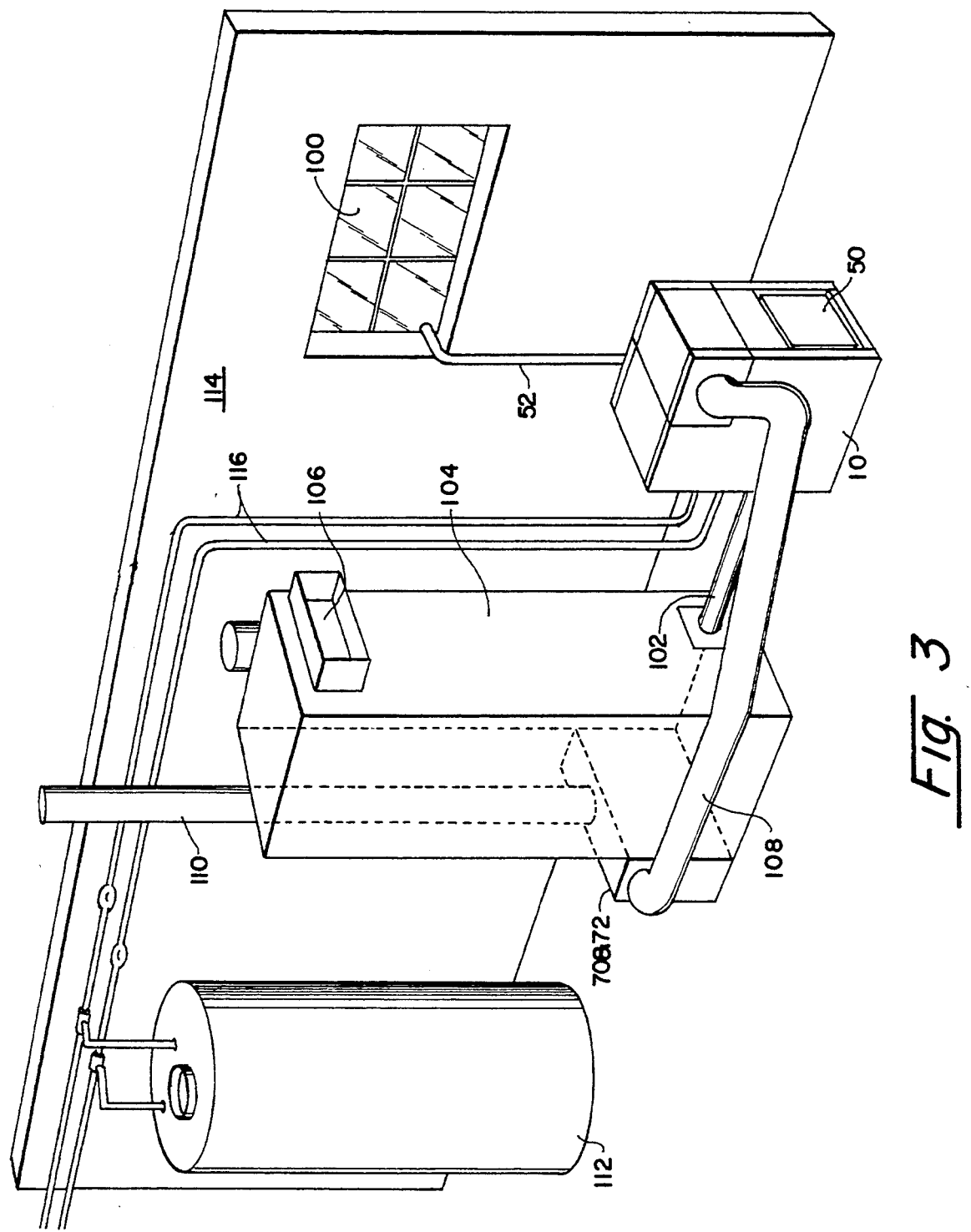
FIG. 3 is a perspective view of an example of the air circulation and conditioning system of the present invention connected for use with a typical hot water heater in an enclosed living space such as a house.

As shown by the example in FIG. 3, the system can be designed so that it can be easily installed within a residential home. The system 10 is positioned, for example, in the basement of a home in which an A/C system is used to cool upper floors of the structure. Accordingly, the air intake 50 is open to the basement area, while the air output 52 is connected though a pipe to the outside air through the window 100. The air intake 42 of the air treatment passageway (not specifically shown in FIG. 3) is connected through a pipe 102 to one side of an central A/C system 104, wherein air is drawn into the system from the upper air intake 106 which receives an air input from the enclosed living space in the upper floors. The air output 44 of the air treatment passageway (also not specifically shown in FIG. 3) is connected through the pipe 108 to the input of a blower 70 before being passed through an evaporator coil 72, whereupon the cooler and drier air is returned through the return air duct 110 to the living space on the upper floors. As previously described, the heater means 54 can be a circulating coil (not shown in FIG. 3) which receives hot water from a hot water heater shown at 112 through the hot water pipe 114, and returns water to the heater through the hot water return 116.

The system thus described has several advantages. In the example given, the system will provide approximately 70 to 90 pints per day of dehumidification capacity. The system 10 easily can be installed with standard central A/C systems and provides whole house dehumidification, in contrast to that provided at selected locations by spot dehumidifiers. The system 10 can operate independently of the A/C system 104 (except that the blower 70 would be used for both systems). Thus, temperature and humidity control can be uncoupled from one another. This allows independent control of the entire home temperature and humidity set points, in contrast to air conditioning systems which control only temperature with humidity reduction as a by-product of a cold evaporator coil.

By design the system 10 is far more efficient with respect to heat or load added to the air conditioning system 104 as compared to the electric dehumidifiers of the prior art. The typical spot electric dehumidifier when used in the home adds roughly 2400 BTUs of heat to the home for every pound of water that it condenses out of the home air. The present system described in the example above adds about 700 BTUs of heat to the home for every pound of water it removes from the home air. Operating costs of the system 10 should be less than an equivalent electric spot dehumidifier given that its energy source is a gas fired water heater (4 to 1 typical ratio for electric to gas price). The coefficient of performance (COP) is defined as the ratio of latent heat associated with the water removed to the power input. Comparing the system 10 of the type described in the example given above, to a standard electric vapor compression dehumidifier, the COP's are:

System 10 has an COP=0.55 using a gas input; while a standard electric dehumidifier has a COP=0.60 using an electric input.

Thus, on an energy basis the two are about equal but on a cost basis the system 10 costs about 75% less to operate. In addition, the central electric A/C cent's energy cost will be substantially less with the desiccant dehumidifier system of the present invention as compared to an electric spot dehumidifier. The electric dehumidifier adds about four times more sensible heat load onto the home A/C system than the desiccant unit. The system rejects the water removed and heat absorbed by the regenerative air stream to a space external from the enclosed living space for which the system 10 is used, without the need for a sump or bucket for drainage as is common with electric spot dehumidifiers.

Finally, a standard hot water heater can be used as a heat source for heating the regenerative air stream further making it easily adapted for residential and light commercial applications.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:

1. In combination with a central air conditioning system including an evaporator coil for removing some of the moisture from air passing through said coil, an improved air recirculation and conditioning system for recirculating and dehumidifying air within a living space, said system comprising:
   conduit means for transmitting air derived entirely from said living space back to said living space;
   air recirculating means for drawing only air from said living space through said conduit means and said evaporator coil; and
   a dehumidification apparatus for removing latent heat and a portion of associated sensible heat only from air recirculated from and to said living space, said dehumidification apparatus comprising:
   (a) an enclosure defining (i) an air treatment passageway, coupled to said conduit means, for transmitting a treated air stream so that air passing through said air treatment passageway is derived entirely from a portion of the air transmitted through said conduit means, treated in said air treatment passageway so as to remove some of the moisture from the treated air stream, subsequently mixed with the remaining portion of air in said conduit means and then passed through said evaporator coil so as to remove additional moisture from said mixed air, and (ii) a regenerative air passageway for transmitting a regenerative air stream derived entirely from and exhausted externally with respect to said living space;
   (b) desiccant means for transferring moisture from the air treatment passageway to the regenerative air passageway;
   (c) means for creating said treated air stream through said air treatment passageway so that air derived entirely from said portion of the air transmitted through said conduit means passes through said desiccant means before being mixed with the remaining portion of air in said conduit means; and
   (d) means for creating said regenerative air stream through said regenerative air passageway so that air derived entirely externally with respect to said living space passes through said desiccant means before exhausting to a space external with respect to said living space.

2. A system according to claim 1, wherein said means for creating said treated air stream through said air treatment passageway draws air so that the air drawn through said air treatment passageway is at a relatively lower flow rate than air drawn through said conduit by said air recirculating means.

3. A system according to claim 2, wherein said means for creating said treated air stream draws air so that the treated air stream is at a flow rate of between about 10% to 20% of the flow rate of air drawn through said conduit by said air recirculating means.

4. A system according to claim 1, wherein said desiccant means includes a desiccant wheel assembly comprising (1) a wheel including a desiccant material and means for mounting said wheel so that at any one moment (a) a portion of said wheel is positioned in said air treatment passageway so that said treated air stream passes through said portion of said wheel and (b) a different portion of said wheel is positioned in said regenerative air passageway so that said regenerative air stream passes through said different portion of said wheel, and (2) means for rotating the wheel about its axis so that said wheel rotates relative to said passageways.

5. A system according to claim 1, wherein said apparatus further includes heater means disposed in said regenerative air passageway for supplying heat to said regenerative air stream, wherein said means for creating said regenerative air stream through said regenerative air passageway draws air derived externally with respect to said living space through said heater means and said desiccant means before exhausting the air to a space external with respect to said living space.

6. A system according to claim 5, wherein said heater means includes heat radiating means, adapted to circulate hot water within said regenerative air passageway, for using hot water to heat said air.

7. A system according to claim 6, further including means for connecting said heat radiating means to a water heater.

8. A system according to claim 7, wherein said heat radiating means includes a tube, disposed in said regenerative air passageway, for circulating said hot water within said regenerative air passageway.

9. A system according to claim 1, further including heat exchanger means for transferring heat from said air treatment passageway to said regenerative air passageway, wherein said means for creating said treated air stream through said air treatment passageway passes air derived from said living space through said desiccant means and said heat exchanger means before being mixed with air in said conduit, and said means for creating said regenerative air stream through said regenerative air passageway draws air derived externally with respect to said living space through said heat exchanger means and said desiccant means before exhausting said regenerative air stream to a space external with respect to said living space.

10. A system according to claim 9, wherein said heat exchanger means includes a heat exchanger assembly for cooling air transmitted through said air treatment passageway after moisture is removed from the air by said desiccant means and heating air transmitted through said second passageway prior to regenerating said desiccant material.

11. A system according to claim 10, wherein said heat exchanger assembly includes (1) a heat wheel including a heat absorptive material, (2) means for mounting said wheel so that at any one moment (a) a portion of said heat wheel is positioned in said air treatment passageway so that air of said treated air stream passes through said portion of said heat wheel and (b) a different portion of said heat wheel is positioned in said regenerative air passageway so that air of said regenerative air stream passes through said different portion of said heat wheel, and (3) means for rotating the wheel about its axis so that said wheel rotates relative to said passageways.

12. A system according to claim 1, further including an air conditioning unit including an evaporation coil disposed in said conduit for cooling the mixture of said air passing through said conduit and said treated air stream, wherein said air recirculating means includes an air conditioning circulation blower.

13. A system according to claim 12, wherein said air conditioning unit further includes a thermostat for controlling the temperature of air in said living space, and said apparatus further includes a humidistat, independent of said thermostat, for controlling the humidity of air in said living space.

14. The combination of claim 1, wherein said enclosure defines said air treatment passageway so that air passing through said air treatment passageway is approximately between about 10% and 20% of the air transmitted through said conduit means.

15. In combination with an air recirculation and conditioning system for recirculating and dehumidifying air within a living space, said system being of the type comprising: an evaporator coil for removing some of the moisture from air transmitted through said coil; conduit means for recirculating air derived entirely from said living space, and transmitting the recirculated air through said evaporator coil and back to said living space; and air recirculating means for drawing air, derived entirely from said living space, through said conduit means and said evaporator coil; and a dehumidification apparatus for removing latent heat and a portion of associated sensible heat from a portion of recirculated air entirely derived from said conduit means, said dehumidification apparatus comprising:

(a) an enclosure defining (i) an air treatment passageway, coupled to said conduit means, for transmitting a treated air stream so that air passing through said air treatment passageway is derived entirely from a portion of the air being transmitted through said conduit means, treated in said air treatment passageway so as to remove moisture from said air, subsequently mixed with the remaining air in said conduit and then passed through said evaporator coil so as to remove additional moisture from the mixed air, and (ii) a regenerative air passageway for transmitting a regenerative air stream derived entirely from and exhausted externally with respect to said living space;

(b) desiccant means for transferring moisture from the air treatment passageway to the regenerative air passageway;

(c) heat exchanger means for transferring sensible heat from said air treatment passageway to said regenerative air passageway;

(d) heater means, disposed in said regenerative air passageway between said desiccant means and said heat exchanger means, for supplying heat to said regenerative air stream;

(e) means for creating said treated air stream through said air treatment passageway so that said portion of air derived entirely from said conduit means passes through said desiccant means and then said heat exchanger means before being mixed with the remaining portion of air in said conduit means; and (f) means for creating said regenerative air stream through said regenerative air passageway so that air entirely derived externally with respect to said living space passes first through said heat exchanger means; then through said heater means and then through said desiccant means before exhausting to a space external with respect to said living space.

16. The combination of claim 15, wherein said enclosure defines said air treatment passageway so that air passing through said air treatment passageway is approximately between about 10% and about 20% of the air transmitted through said conduit means.

17. A method of recirculating, dehumidifying and cooling air within a living space, said method comprising the steps of:

transmitting only air entirely derived from said living space through conduit means;

drawing only a portion of said air from said conduit means and passing said air portion through an air treatment passageway wherein said air portion is passed through desiccant means for transferring moisture from the air treatment passageway to a regenerative air passageway so as to reduce the moisture content of said air portion, while simultaneously passing a regenerative air stream entirely derived externally of said living space through said regenerative air passageway so as to absorb moisture transferred from said air treatment passageway to said regenerative air passageway and entirely exhausted externally of said living space;

mixing said air portion having a reduced moisture content with the air in said conduit means so as to provide a mixed air flow; and passing said mixed air flow through an air conditioning evaporator coil and into said living space.

18. The method according to claim 17, wherein said step of drawing only a portion of said air from said conduit means and passing said air portion through an air treatment passageway includes the step of drawing between about 10% and about 20% of the air from said conduit means.

* * * * *